(12) United States Patent
Hwang

(10) Patent No.: US 12,343,859 B2
(45) Date of Patent: Jul. 1, 2025

(54) ROBOT ARM SYSTEM FOR MAKING ICE CREAM AND METHOD OF CONTROLLING SAME

(71) Applicant: XYZ INC., Seoul (KR)

(72) Inventor: Sung Jae Hwang, Seongnam-si (KR)

(73) Assignee: XYZ INC., Seoul (KR)

( * ) Notice: Subject to any disclaimer, the term of this patent is extended or adjusted under 35 U.S.C. 154(b) by 152 days.

(21) Appl. No.: 18/222,006

(22) Filed: Jul. 14, 2023

(65) Prior Publication Data

US 2023/0364801 A1 Nov. 16, 2023

Related U.S. Application Data

(63) Continuation of application No. PCT/KR2021/018415, filed on Dec. 7, 2021.

(30) Foreign Application Priority Data

Apr. 22, 2021 (KR) .......................... 10-2021-0052047

(51) Int. Cl.
*B25J 11/00* (2006.01)
*A23G 9/04* (2006.01)
(Continued)

(52) U.S. Cl.
CPC .............. *B25J 11/0045* (2013.01); *A23G 9/04* (2013.01); *B25J 15/0033* (2013.01); *B25J 19/023* (2013.01)

(58) Field of Classification Search
CPC .. B25J 11/0045; B25J 15/0033; B25J 19/023; B25J 11/008; A23G 9/04; G07F 11/165; G07F 17/0071
See application file for complete search history.

(56) References Cited

U.S. PATENT DOCUMENTS

| | | | | |
|---|---|---|---|---|
| 3,828,660 A | * | 8/1974 | Mueller | A23G 9/286 53/550 |
| 3,876,110 A | * | 4/1975 | Logie | A23G 9/28 53/518 |

(Continued)

FOREIGN PATENT DOCUMENTS

| | | | |
|---|---|---|---|
| CN | 109064667 A | * | 12/2018 |
| CN | 208254053 U | * | 12/2018 |

(Continued)

OTHER PUBLICATIONS

"The Realization of Intelligent Robot System for Milk Tea Production;" Hu et al., IEEE Robotics and Automation Letters (vol. 6, Issue: 4, 2021, pp. 8689-8693); Oct. 1, 2021. (Year: 2021).*

(Continued)

*Primary Examiner* — Khoi H Tran
*Assistant Examiner* — Jorge O Peche
(74) *Attorney, Agent, or Firm* — Dinsmore & Shohl LLP; Yongsok Choi, Esq.

(57) ABSTRACT

Disclosed herein is a method of controlling a robot arm to make ice cream. The method of controlling includes: receiving ice cream order information; gripping an ice cream capsule disposed on a table using the gripper of a robot arm; placing the ice cream capsule on a capsule support; gripping a cup configured to accommodate ice cream using the gripper of the robot arm; moving the cup under the capsule support while the gripper is gripping the cup; and discharging ice cream in the ice cream capsule to the cup. Discharging the ice cream includes controlling the robot arm so that the cup is rotated while the ice cream is being discharged.

14 Claims, 7 Drawing Sheets

(51) Int. Cl.
  *B25J 15/00* (2006.01)
  *B25J 19/02* (2006.01)

(56) References Cited

U.S. PATENT DOCUMENTS

| | | | | |
|---|---|---|---|---|
| 4,889,210 | A * | 12/1989 | Alcaraz | G07F 9/10 901/50 |
| 6,513,677 | B1 * | 2/2003 | Sorensen | G07F 11/42 221/242 |
| 6,637,214 | B1 * | 10/2003 | Leitzke | A23G 9/163 62/342 |
| 7,837,059 | B2 * | 11/2010 | Hieb | G07F 11/10 221/133 |
| 7,896,038 | B2 * | 3/2011 | Jones | A23G 9/245 141/103 |
| 7,914,199 | B2 * | 3/2011 | Kateman | A23G 9/48 366/144 |
| 8,315,733 | B2 * | 11/2012 | Hales, Jr. | G07F 11/58 221/24 |
| 8,989,893 | B2 * | 3/2015 | Jones | A23G 9/22 221/24 |
| 9,826,755 | B1 * | 11/2017 | Hsu | A23G 9/28 |
| 10,477,879 | B2 * | 11/2019 | Cocchi | A23G 9/288 |
| 10,993,458 | B2 * | 5/2021 | Cocchi | A23G 9/22 |
| 11,102,992 | B2 * | 8/2021 | Douer | A23G 9/30 |
| 11,785,963 | B2 * | 10/2023 | Douer | H02J 3/144 222/1 |
| 2003/0047569 | A1 * | 3/2003 | Chirnomas | B65G 47/917 221/210 |
| 2005/0064077 | A1 * | 3/2005 | Harra | A23G 9/20 426/249 |
| 2005/0258187 | A1 * | 11/2005 | Savage | A23G 9/28 222/1 |
| 2007/0267087 | A1 * | 11/2007 | Jones | A23G 9/228 141/18 |
| 2008/0073376 | A1 * | 3/2008 | Gist | B67D 1/0043 222/145.5 |
| 2009/0117242 | A1 * | 5/2009 | Kateman | A23G 9/42 426/474 |
| 2010/0075013 | A1 * | 3/2010 | Takata | A23G 9/28 99/461 |
| 2011/0073618 | A1 * | 3/2011 | Anderson | B67D 1/07 222/145.2 |
| 2013/0103198 | A1 * | 4/2013 | Nakamoto | G07F 17/26 700/257 |
| 2014/0120235 | A1 * | 5/2014 | Jones | G07F 17/0064 901/30 |
| 2014/0157698 | A1 * | 6/2014 | Cihak | A23G 9/28 52/234 |
| 2016/0242434 | A1 * | 8/2016 | Jones | A23G 9/225 |
| 2017/0071228 | A1 * | 3/2017 | Ferraz Cury | A23G 9/28 |
| 2018/0368437 | A1 * | 12/2018 | Cocchi | A23G 9/52 |
| 2019/0159476 | A1 * | 5/2019 | Anziano | A23G 9/22 |
| 2019/0166874 | A1 * | 6/2019 | Douer | A23G 9/30 |
| 2019/0217477 | A1 * | 7/2019 | Paepcke | B25J 9/1679 |
| 2019/0272699 | A1 * | 9/2019 | Mohammed | G07F 13/10 |
| 2020/0029588 | A1 * | 1/2020 | Tollefson | A23G 9/28 |
| 2020/0090099 | A1 * | 3/2020 | Johnson | B25J 9/161 |
| 2020/0113373 | A1 * | 4/2020 | Knuepfel | B25J 9/023 |
| 2020/0327769 | A1 * | 10/2020 | Anziano | A23G 9/288 |
| 2021/0073765 | A1 * | 3/2021 | Xu | G07F 9/009 |
| 2021/0342020 | A1 * | 11/2021 | Jorasch | G06F 3/011 |
| 2021/0373676 | A1 * | 12/2021 | Jorasch | A63F 13/215 |
| 2021/0374391 | A1 * | 12/2021 | Jorasch | G06V 40/19 |
| 2021/0399911 | A1 * | 12/2021 | Jorasch | H04L 12/1818 |
| 2021/0400142 | A1 * | 12/2021 | Jorasch | H04L 65/1069 |
| 2022/0088791 | A1 * | 3/2022 | Tumino | G07F 17/0071 |
| 2022/0174978 | A1 * | 6/2022 | Douer | H02J 3/144 |
| 2022/0180299 | A1 * | 6/2022 | Väin | G06Q 10/087 |
| 2023/0011258 | A1 * | 1/2023 | Krappen | A23G 9/288 |
| 2023/0011850 | A1 * | 1/2023 | Krappen | A23G 9/288 |
| 2023/0267793 | A1 * | 8/2023 | Anziano | G07F 17/0071 99/484 |
| 2023/0364801 | A1 * | 11/2023 | Hwang | G07F 17/0071 |

FOREIGN PATENT DOCUMENTS

| | | | | |
|---|---|---|---|---|
| CN | 209376613 U | * | 9/2019 | |
| CN | 112822947 A | * | 5/2021 | A23G 9/224 |
| CN | 215341247 U | * | 12/2021 | |
| EP | 3417715 A1 | * | 12/2018 | A23G 9/045 |
| JP | 2002027918 A | * | 1/2002 | |
| JP | 2006217868 A | * | 8/2006 | |
| JP | 2020011311 A | * | 1/2020 | |
| JP | 2022502273 A | * | 1/2022 | |
| KR | 200232320 Y1 | * | 10/2001 | |
| KR | 101615541 B1 | | 4/2016 | |
| KR | 101919968 B1 | | 11/2018 | |
| KR | 20200125845 A | * | 11/2020 | |
| KR | 1020200125845 A | | 11/2020 | |
| KR | 20210098718 A | * | 8/2021 | |
| SG | 11202007683Q A | * | 9/2020 | |
| TR | 201807865 U5 | * | 7/2018 | |
| TW | M479294 U | * | 6/2014 | |
| TW | M542356 U | * | 6/2017 | |
| WO | WO-2014075164 A1 | * | 5/2014 | F25D 11/00 |
| WO | WO-2019156622 A1 | * | 8/2019 | A23G 3/2076 |

OTHER PUBLICATIONS

"An autonomous ice-cream serving robot;" Xue et al.; 2011 IEEE International Conference on Robotics and Automation (2011, pp. 3451-3452); May 1, 2011. (Year: 2011).*

"A compact underactuated gripper with two fingers and a retractable suction cup;" Courchesne et al., Frontiers in Robotics and AI, 10, 1066516; Apr. 17, 2023. (Year: 2023).*

* cited by examiner

ROBOT ARM SYSTEM FOR MAKING ICE CREAM AND METHOD OF CONTROLLING SAME

CROSS-REFERENCE TO RELATED APPLICATIONS

This application is a continuation of International Application No. PCT/KR2021/018415 filed on Dec. 7, 2021, which claims priority to Korean Patent Application No. 10-2021-0052047 filed on Apr. 22, 2021, the entire contents of which are herein incorporated by reference.

TECHNICAL FIELD

The present invention relates to a robot arm system for making ice cream and a method of controlling the same. More particularly, the present invention relates to a method and system for controlling a robot arm that can automatically extract ice cream, put it into a cup, and provide it to a user by using capsule-type ice cream and a robot arm.

BACKGROUND ART

Conventionally, in order to put ice cream into a cup or cone, a person scoops a predetermined amount of ice cream with a spoon or spatula, puts the ice cream into a cup or cone, and sells the ice cream. There is no problem with the ice cream that is packaged and sold individually. The ice cream that is scooped with a spoon or spatula and then sold is problematic in that cleanliness is poor in terms of hygiene because a large container containing ice cream has to be opened every time ice cream is sold, in that the amount of ice cream scooped with a spoon or spatula is not uniform, and in that a lot of human labor is required to dig up frozen ice cream.

To overcome these problems, there is a technology that allows ice cream to be discharged by the operation of a machine. There are cases where ice cream is squeezed out with an extruder and sold in cups or cones by human hands. Even in these cases, there is a problem in that a person's skilled hand technique and close attention are required to uniformly put ice cream into a cup or cone with one hand without spilling the ice cream while operating the extruder with the other hand.

With the recent development of robot technology, unmanned robots are being developed to prepare drinks or dishes and transfer them. However, robots that automatically make ice cream have not been developed. Therefore, there is a need for a robot arm system that can extract ice cream, put it into a cup, and provide it to a customer by controlling the movement of a robot arm.

RELATED ART DOCUMENT

Patent document: Korean Patent No. 10-1919968

SUMMARY

Technical Problem

The present invention has been conceived to overcome the above-described problems, and an object of the present invention is to provide a robot arm system control method and robot arm system that can automatically make ice cream based on the order information of a user by using a robot arm.

An object of the present invention is to provide a robot arm system that can reduce human labor and can rapidly make ice cream with uniform quality regardless of skill level.

An object of the present invention is to provide a method of controlling a robot arm system that can make ice cream in a uniform shape based on the type, shape, or hardness of the ice cream.

An object of the present invention is to provide a robot arm system that can provide an integrated service including the ordering, payment, making, and delivery of ice cream.

The technical problems of the present invention are not limited to the above-described technical problems, and other technical problems that have not been described above will be clearly understood by those of ordinary skill in the art from the following description.

Technical Solution

According to an aspect of the present invention, there is provided a method of controlling a robot arm to make ice cream, the method including: receiving ice cream order information; gripping an ice cream capsule disposed on a table using the gripper of a robot arm; placing the ice cream capsule on a capsule support; gripping a cup configured to accommodate ice cream using the gripper of the robot arm; moving the cup under the capsule support while the gripper is gripping the cup; and discharging ice cream in the ice cream capsule to the cup; wherein discharging the ice cream includes controlling the robot arm so that the cup is rotated while the ice cream is being discharged.

Discharging the ice cream may include: pressing the ice cream capsule disposed on the capsule support through the downward movement of a push bar; and discharging the ice cream through a hole in the bottom surface of the ice cream capsule in response to the pressure applied by the push bar.

The method may further include: determining the hardness of the ice cream using a pressure sensor disposed on a bottom surface of the push bar; and controlling the robot arm so that the rotation speed of the cup is changed based on the hardness of the ice cream.

The pressure applied by the push bar may be changed based on the type of ice cream.

The robot arm may be controlled such that the rotation speed of the cup is changed based on the type of ice cream.

The robot arm may be controlled such that the rotation speed and rotation radius of the cup are changed based on the size of the cup.

An image sensor configured to photograph the bottom surface of the ice cream capsule is disposed on a bottom surface of the capsule support.

The image sensor may be an infrared (IR) sensor, the time point at which the ice cream starts to be discharged may be recognized via the image sensor, the time difference between the time point at which the ice cream starts to be discharged and the time point at which the push bar starts to operate may be calculated, and the robot arm may be controlled such that the rotation speed of the cup is changed based on the time difference.

The image sensor may be an infrared (IR) sensor, the time point at which the ice cream starts to be discharged and the time point at which the discharge of the ice cream ends may be recognized via the image sensor, and the robot arm may be controlled such that the cup is rotated in the state of being inclined at a predetermined angle while the ice cream is being discharged.

The type of ice cream may be recognized via the image sensor, and the robot arm may be controlled such that the rotation speed of the cup is changed based on the type of ice cream.

The method may further include, after discharging the ice cream: placing the cup, in which the ice cream is accommodated, at a predetermined location; and gripping the ice cream capsule placed on the capsule support, and discharging the ice cream capsule to a predetermined discharge hole.

According to another aspect of the present invention, there is provided a robot arm system for controlling a robot arm for the making of ice cream, the robot arm system including: a robot arm including a gripper and a plurality of arms; a processor configured to receive and process ice cream order information; and a capsule support configured to support an ice cream capsule; wherein the processor is further configured to: grip the ice cream capsule disposed on a table using the gripper of the robot arm; place the ice cream capsule on the capsule support; grip a cup configured to accommodate ice cream using the gripper of the robot arm; move the cup under the capsule support while the gripper is gripping the cup; and discharge ice cream in the ice cream capsule to the cup; and wherein the processor is further configured to control the robot arm so that the cup is rotated while the ice cream is being discharged.

The robot arm system may further include a push bar configured to press the ice cream capsule disposed on the capsule support; and the ice cream may be discharged through a hole in the bottom surface of the ice cream capsule in response to the pressure applied by the push bar.

The robot arm system may further include a pressure sensor disposed on the bottom surface of the push bar, and the processor may be further configured to control the robot arm so that the rotation speed of the cup is changed based on the hardness of the ice cream determined using the pressure sensor.

The processor may be further configured to change the pressure applied by the push bar based on the type of ice cream.

The processor may be further configured to control the robot arm so that the rotation speed of the cup is changed based on the type of ice cream.

The processor may be further configured to control the robot arm so that the rotation speed and rotation radius of the cup are changed based on the size of the cup.

The robot arm system may further include an image sensor configured to photograph the bottom surface of the ice cream capsule and to be disposed on the bottom surface of the capsule support.

The image sensor may be an infrared (IR) sensor, and the processor may be further configured to recognize the time point at which the ice cream starts to be discharged via the image sensor, to calculate the time difference between the time point at which the ice cream starts to be discharged and the time point at which the push bar starts to operate, and to control the robot arm so that the rotation speed of the cup is changed based on the time difference.

The processor may be further configured to recognize the type of ice cream via the image sensor and to control the robot arm so that the rotation speed of the cup is changed based on the type of ice cream.

The processor may be further configured to, after discharging the ice cream, place the cup, in which the ice cream is accommodated, at a predetermined location, grip the ice cream capsule placed on the capsule support, and discharge the ice cream capsule to a predetermined discharge hole.

The robot arm system may further include a display disposed on the table, and the display may be configured to display the ice cream order information and to display completion information when the making of the ice cream is completed.

Advantageous Effects

According to the present invention, there may be provided the robot arm system control method and robot arm system that can automatically make ice cream based on the order information of a user by using the robot arm.

According to the present invention, there may be provided the robot arm system that can reduce human labor and can rapidly make ice cream with uniform quality regardless of skill level.

According to the present invention, there may be provided the method of controlling a robot arm system that can make ice cream in a uniform shape based on the type, shape, or hardness of the ice cream.

According to the present invention, there may be provided the robot arm system that can provide an integrated service including the ordering, payment, making, and delivery of ice cream.

The effects of the present invention are not limited to the above-described effects, and other effects that have not been described above will be clearly understood by those of ordinary skill in the art from the following description.

DESCRIPTION OF DRAWINGS

The above and other objects, features and advantages of the present invention will be more clearly understood from the following detailed description taken in conjunction with the accompanying drawings, in which.

DETAILED DESCRIPTION

Figure 1:
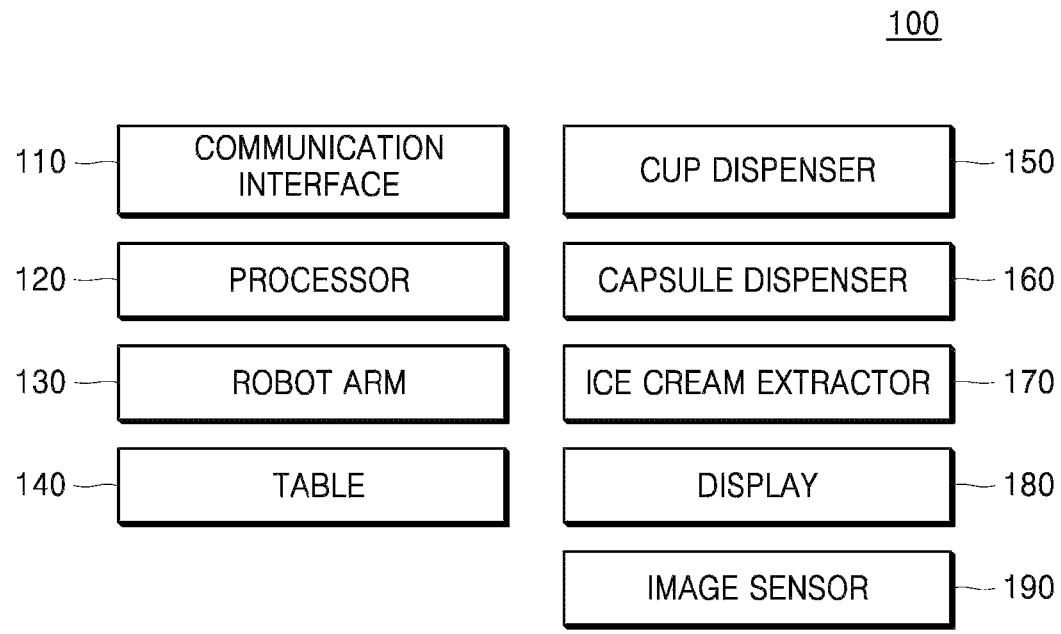
FIG. 1 is a block diagram illustrating the configuration of a robot arm system for making ice cream according to an embodiment of the present invention.

Embodiments of the present invention will be described in detail below with reference to the accompanying drawings so that those of ordinary skill in the art to which the present invention pertains can easily implement the present invention. However, the present invention may be embodied in various different forms and is not limited to the embodiments described herein. Furthermore, in order to clearly illustrate the embodiments of the present invention in the drawings, portions irrelevant to the illustration are omitted.

The terms used herein are intended to describe only specific embodiments and are not intended to limit the present invention. In this specification, a singular form also includes a plural form unless the context clearly dictates otherwise.

In this specification, the terms such as "comprise," "have," or "include" are intended to designate features, numbers, steps, operations, components, parts, or combinations thereof described in the specification as being present. It can be understood that this does not preclude in advance the possibility of the presence or addition of one or more other features, numbers, steps, operations, components, parts, or combinations thereof.

Furthermore, the components appearing in the embodiments of the present invention are shown independently of each other to represent distinct characteristic functions, and this does not mean that each of the components is configured in the form of a separate piece of hardware or a single software unit. In other words, individual components are listed as respective components for ease of description. At least two of the individual components may be combined into a single component, or a single component may be divided into a plurality of components and perform a function. An embodiment in which some components are combined together and an embodiment in which a single component is divided into a plurality of components are also included in the scope of the present invention as long as they do not depart from the gist of the present invention.

Moreover, the following embodiments are provided to more clearly describe the present invention to those of ordinary skill in the art, and the shapes and sizes of the components in the drawings may be exaggerated for more clear illustration.

The embodiments of the present invention will be described below with reference to the accompanying drawings.

Figure 2:
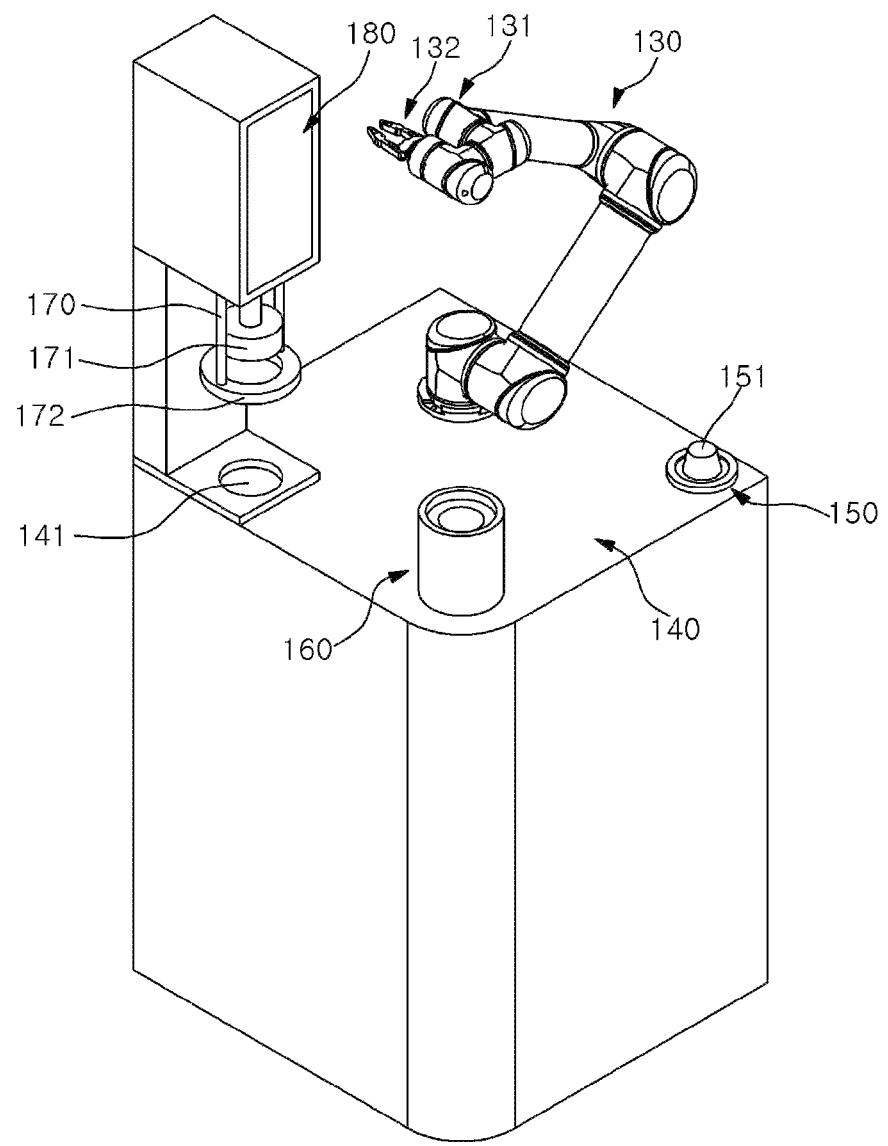
FIG. 2 is an exemplary view illustrating the configuration and arrangement of the robot arm system according to the embodiment of the present invention.

FIG. 1 is a block diagram illustrating the configuration of a robot arm system 100 for making ice cream according to an embodiment of the present invention, and FIG. 2 is an exemplary view illustrating the configuration and arrangement of the robot arm system 100 according to the embodiment of the present invention.

Referring to FIGS. 1 and 2, the robot arm system 100 for making ice cream may include a communication interface 110, a processor 120, a robot arm 130, a table 140, a cup dispenser 150, a capsule dispenser 160, an ice cream extractor 170, a display 180, and an image sensor 190. Some components may be omitted or additional components may be added as needed.

The communication interface 110 is configured to receive necessary information from an external server or an external device or transmit acquired information to an external server or an external device over a network. In this case, the network may be a network connected via a wired or wireless connection. Furthermore, the connection network may be a network over which an external device and the mobile robot are directly connected, or may be a private network which is generated by a repeater. When the network is a wireless communication network, it may include a network for cellular communication or short-range communication. For example, the cellular communication may include at least one of Long-Term Evolution (LTE), LTE Advanced (LTE-A), 5th Generation (5G), Code Division Multiple Access (CDMA), Wideband CDMA (WCDMA), Universal Mobile Telecommunications System (UMTS), Wireless Broadband (WiBro), and Global System for Mobile Communications (GSM). Furthermore, the short-range communication may include at least one of Wireless Fidelity (Wi-Fi), Bluetooth®, Zigbee, and Near Field Communication (NFC). However, the communication method is not limited thereto, and will include wireless communication technology to be developed in the future.

The processor 120 is configured to process ice cream order information received through the communication interface 110, to perform control related to the operation, such as movement and rotation, of the robot arm and the operation of gripping an object in order to make an ordered type of ice cream, and to perform various types of processing related to the motion control of the robot arm, image processing, and recognition operation. For example, the processor 120 may include a central processing unit (CPU) and an application processor (AP), and may also include memory capable of storing commands or data related to one or more other components therein or may access necessary information by communicating with memory within the robot arm system 100 or external memory if necessary.

The processor 120 may be configured to grip an ice cream capsule 161 disposed on the table 140 using the gripper 132 of the robot arm 130, to place the ice cream capsule 161 on a capsule support 172 in the ice cream extractor 170 in order to extract ice cream, to grip a cup 151 configured to accommodate ice cream using the gripper 132 of the robot arm 130, to move the cup 151 under the capsule support 172 while the gripper 132 is gripping the cup 151, and to discharge ice cream in the ice cream capsule 161 to the cup 151. Furthermore, the processor 120 may be configured to control the robot arm 130 so that the cup 151 is rotated while ice cream is being discharged, and may control the robot arm 130 in real time so that the rotation speed and rotation radius of the cup 151 and the angle at which the cup 151 is inclined during rotation are changed based on information such as the type, hardness, and size of ice cream in order to make uniform whirlwind-shaped ice cream.

The robot arm 130 may be configured to grip and move the ice cream capsule 161 and the cup 151 configured to accommodate ice cream according to the control signal of the processor 120, and may perform a process of making ice cream using any one of a plurality of predetermined movement control methods stored in the memory. In this case, the robot arm 130 may include arms 131 and the gripper 132 in one embodiment, and the specific form or configuration method of the robot arm 130 may vary in various manners depending on embodiments. For example, the arms 131 include a plurality of joints, and each of the joints may operate to allow a corresponding arm coupled to the joint to roll, pitch, and yaw. Furthermore, the gripper 132 may be configured to grip an object under the control of the processor 120, and may be configured to be coupled to one side of the arms 131. An object at a designated location may be gripped and moved or rotated via the gripper 132 by the cooperative operation of the arms 131 and the gripper 132.

The table 140 may be configured to place and support components such as the robot arm 130, the cup dispenser 150, the capsule dispenser 160, the ice cream extractor 170, and the display 180 in a plurality of designated areas. Furthermore, the table 140 may include a discharge hole 141 configured to discard a capsule container remaining after ice cream has been extracted via the ice cream capsule 161.

The cup dispenser 150 may be configured such that one or more cups 151 can be placed therein. The cups 151 may be fixed into the depression of the cup dispenser 150 in an inverted state so that the cups 151 do not fall over, and may be gripped one by one via the robot arm 130.

The capsule dispenser 160 may be configured such that the ice cream capsule 161 containing ice cream can be placed therein. Ice cream capsules 161 of the types selected by orders of users may be taken out through the capsule dispenser 160 one by one while being present in a refrigerator built in the table 140. Alternatively, it may also be possible to manually place the ice cream capsules 161 onto the capsule dispenser 160. Alternatively, a plurality of capsule dispensers 160 may be disposed such that ice cream capsules 161 having various flavors can be disposed in the corresponding capsule dispensers 160.

In addition, an RFID tag, a QR code, or a color code including ice cream identification information about the type, flavor, size, and/or the like of ice cream may be attached to each of the ice cream capsules 161. Accordingly, the type of ice cream capsule 161 may be automatically determined through the signal reception of the communication interface 110 or image recognition processing via the image sensor 190.

The ice cream extractor 170 may be disposed on the table 140 in a tower form, and may include a push bar 171 configured to be movable up and down in order to discharge ice cream by pressing the ice cream capsule 161 and a capsule support 172 configured to place the ice cream capsule thereon. For example, the gripper 132 of the robot arm 130 may grip the ice cream capsule 161 from the capsule dispenser 160 and place the ice cream capsule 161 on the capsule support 172, and the capsule support 172 has a structure in which the center thereof is circularly opened in order to discharge ice cream downward. When the ice cream capsule 161 is placed on the capsule support 172, the push bar 171 applies pressure to and presses the top surface of the ice cream capsule while moving downward under the control of the processor 120, and the ice cream may be discharged downward through a hole formed in the bottom surface of the ice cream capsule 161 according to the pressure applied by the push bar 171.

In addition, the push bar 171 may include a pressure sensor disposed on the bottom surface thereof. The processor 120 may control the robot arm 130 so that the rotation speed of the cup 151 is changed based on the hardness of the ice cream determined using a value measured via the pressure sensor of the push bar 171. For example, when it is determined that the hardness of the ice cream is high, the rotation speed of the cup 151 may be lowered because the discharge speed of the ice cream is relatively low. In contrast, when the hardness of the ice cream is low, the rotation speed of the cup 151 may be increased because the discharge speed of the ice cream is relatively high. Furthermore, the hardness of the ice cream may vary depending on the type of ice cream such as ice cream having a vanilla flavor, ice cream having a strawberry flavor, or ice cream having a chocolate flavor. Accordingly, the processor 120 may be configured to change the pressure applied by the push bar 171 according to the type of the ice cream capsule 161 based on the ordered type of ice cream.

The display 180 may be configured to display information related to an order of a user, and may also be configured to receive an ice cream order through the touch input of a user. For example, the display 180 may be disposed on a front side in the state of being combined with the tower-shaped ice cream extractor 170. Furthermore, for example, the display 180 may be configured to display images related to progress status upon the start of the making of ice cream, during the making of ice cream, and after the completion of the making of ice cream, to display ice cream order information when an ice cream order is made, and to display completion information when the making of ice cream is completed.

The image sensor 190 may be configured to photograph an image requiring analysis so that the processor 120 can analyze the image and to transmit it to the processor 120. For example, the image sensor 190 may be disposed on the capsule support 172 to photograph an image of a state in which ice cream is discharged from the ice cream capsule 161. Furthermore, the image sensor 190 may be configured to be provided at an independent location separate from the location of the ice cream extractor 170 and to photograph an overall ice cream making process.

For example, the image sensor may be an infrared (IR) sensor, and may be configured to be disposed on the bottom surface of the capsule support 172 and to photograph the bottom surface of the ice cream capsule 161. The image sensor may recognize the time point at which ice cream starts to be discharged through the bottom hole of the ice cream capsule 161 via the image sensor 190. The processor 120 may calculate the time difference between the time point at which ice cream starts to be discharged and the time point at which the push bar 171 starts to operate, and may control the robot arm 130 so that the rotation speed of the cup 151 is changed based on the time difference. For example, when the difference between t1, which is the time point at which the push bar 171 starts to press the ice cream capsule 161, and t2, which is the time point at which the ice cream starts to be discharged through the bottom hole of the ice cream capsule 161, is large, it may be determined that the hardness of the ice cream is high, and the robot arm 130 may be controlled such that the rotation speed of the cup 151 is low. In contrast, when the difference between t1 and t2 is small, it may be determined that the hardness of the ice cream is low, in which case the discharge speed of the ice cream is relatively high, so that the robot arm 130 may be controlled such that the rotation speed of the cup 151 is high. Furthermore, when the image sensor 190 is a camera sensor capable of recognizing colors, the color information of the ice cream capsule 161 may be recognized, and the robot arm 130 may be controlled such that the cup 151 is rotated at a speed predetermined according to the type of ice cream.

FIG. 2 is an exemplary view illustrating the configuration and arrangement of the robot arm system 100 according to the embodiment of the present invention.

Referring to FIG. 2, the robot arm 130, the cup dispenser 150, the capsule dispenser 160, the ice cream extractor 170, and the display 180 may be disposed on the table 140, and an ice cream making process may be performed on the table 140 through the movement control of the robot arm 130 including the arms 131 and the gripper 132.

The capsule dispenser 160 may be configured such that the ice cream capsules 161 containing ice cream can be disposed, and the ice cream capsules 161 may be taken out from the table 140 via the capsule dispenser 160 one by one. Alternatively, it may also be possible to manually place the ice cream capsules 161 onto the capsule dispenser 160. Furthermore, the robot arm 130 may put down the ice cream cup 151 onto the capsule dispenser 160 to provide a finally completed ice cream cup to a user.

Furthermore, the ice cream capsule 161 may be gripped using the gripper 132 of the robot arm 130, and the gripped ice cream capsule 161 may be placed on the capsule support 172. When the ice cream capsule 161 is placed on the capsule support 172, the ice cream capsule 161 placed on the capsule support 172 is pressed through the downward movement of the push bar 171 of the ice cream extractor 170, the hole formed in the bottom surface of the ice cream capsule 161 is opened according to the pressure applied by the push bar 171, and then ice cream is discharged.

Furthermore, the cup dispenser 150 may be configured such that one or more cups 151 can be disposed therein. The cups 151 may be placed in the depression of the cup dispenser 150 in an inverted state so that the cups 151 do not fall over, and may be gripped one by one via the robot arm 130. The robot arm 130 may allow the ice cream discharged downward from the ice cream capsule 161 to be accommodated in the cup 151 by moving the gripped cup 151 under the capsule support 172. In this case, whirlwind-shaped ice cream may stably and uniformly be made by rotating the cup 151.

Furthermore, the robot arm 130 may be configured to discard a remaining capsule container through the discharge hole 141 disposed in a predetermined area when overall ice cream extraction from the ice cream capsule 161 is completed.

In addition, the display 180 that may be integrated with the ice cream extractor 170 may be configured to display information related to an order of a user, and may be configured to receive an ice cream order through the touch input of a user. For example, a user may check progress status, such as the reception of an order, the start of the making of ice cream, the progress of the making of ice cream, and the completion of the making of ice cream, via the display 180.

Figure 3:
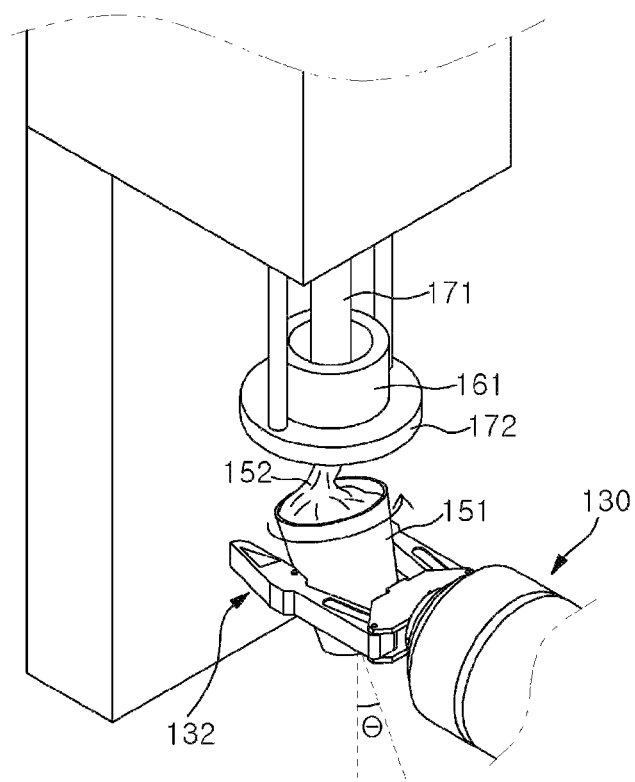
FIG. 3 is an exemplary view illustrating the state in which ice cream is extracted using a robot arm according to an embodiment of the present invention.

FIG. 3 is an exemplary view illustrating a state in which ice cream is extracted using a robot arm according to an embodiment of the present invention.

Referring to FIG. 3, when the ice cream capsule 161 is placed on the capsule support 172, the ice cream capsule 161 is pressed through the downward movement of the push bar 171 of the ice cream extractor 170, and the ice cream 152 is discharged through the hole formed in the bottom surface of the ice cream capsule 161 in response to the pressure applied by the push bar 171. In this case, the gripper 132 of the robot arm 130 may grip the cup 151, move the cup 151 under the capsule support 172, and wait, and the movement of the robot arm 130 and the gripper 132 may be controlled such that the cup 151 is rotated while the ice cream 152 is being discharged, thereby making whirlpool-shaped ice cream.

In this case, the robot arm 130 may be controlled such that the rotation speed, rotation radius, and inclination angle of the cup 151 are changed based on information such as the type, hardness, and size of ice cream in order to form the uniform whirlwind shape of ice cream. For example, the time point at which ice cream starts to be discharged may be recognized using the image sensor 190, such as an infrared (IR) sensor, disposed on the capsule support 172, and ice cream may be stacked while raising the cup 151 from the time point at which ice cream starts to be discharged and then rotating the cup 151 in a state inclined at a predetermined angle θ, thereby more stably making ice cream in a whirlpool shape.

Furthermore, the time point at which the ice cream 152 starts to be discharged and the time point at which the discharge of the ice cream 152 ends may be recognized via the image sensor 190 such as an infrared (IR) sensor, and the robot arm 130 may be controlled such that the robot arm 130 can rotate the cup 151 in the state of being inclined at a predetermined angle while the ice cream 152 is being discharged.

Furthermore, the time point at which the ice cream 152 starts to be discharged may be recognized via the image sensor 190, the time difference between the time point at which the ice cream 152 starts to be discharged and the time point at which the push bar 171 starts to operate may be calculated, and the robot arm may be controlled such that the rotation speed of the cup 151 is changed based on the calculated time difference. For example, when the difference between t1 at which the push bar 171 starts to press the ice cream capsule 161 and t2 at which the ice cream starts to be discharged through the bottom hole of the ice cream capsule 161 is large, it may be determined that the hardness of the ice cream is high, and the robot arm 130 may be controlled such that the rotation speed of the cup 151 is low. In contrast, when the difference between t1 and t2 is small, it is determined that the hardness of the ice cream is low, in which case the discharge speed of the ice cream is relatively high, so that the robot arm 130 can be controlled such that the rotation speed of the cup 151 is high.

Furthermore, for example, the direction in which the ice cream is bent may be recognized by recognizing the direction in which the ice cream is bent by using the image sensor 190 such as a camera sensor, and the robot arm 130 may be controlled such that the cup 151 is rotated in the corresponding direction, thereby forming uniformly-shaped ice cream.

FIGS. 4A to 4F are exemplary views illustrating the operation of a robot arm system according to an embodiment of the present invention.

Figure 4A:
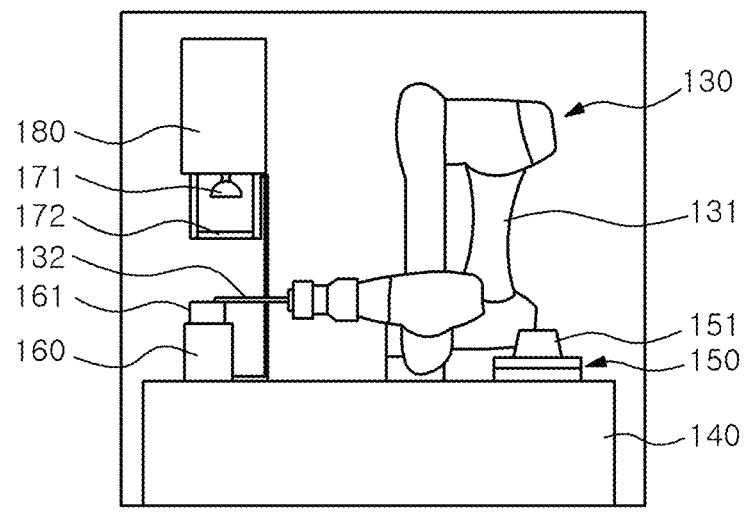
FIGS. 4A to 4F are exemplary views illustrating the operation of a robot arm system according to an embodiment of the present invention.

FIG. 4A shows the step of gripping the ice cream capsule 161 placed in the capsule dispenser 160 via the gripper 132 of the robot arm 130 after receiving an ice cream order.

Figure 4B:
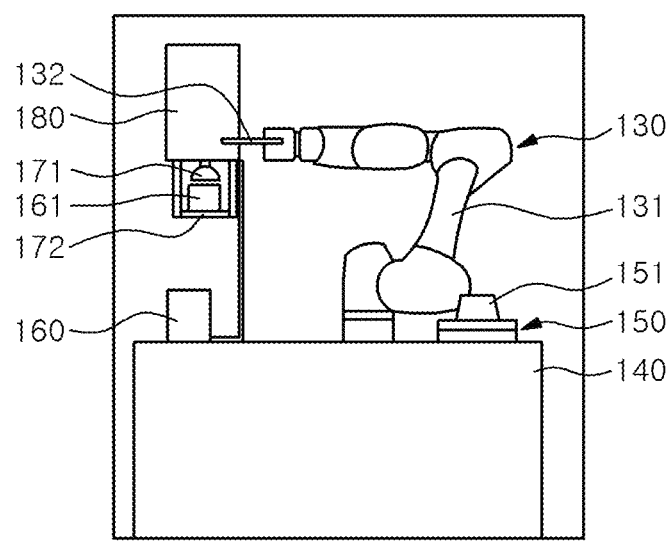

FIG. 4B shows the step of moving the ice cream capsule 161 and placing the ice cream capsule 161 on the capsule support 172 of the ice cream extractor 170.

Figure 4C:
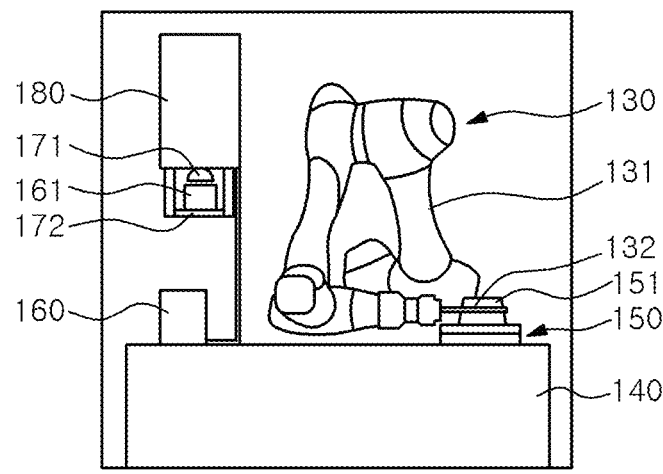

FIG. 4C shows the step of gripping the ice cream cup 151 placed in the cup dispenser 150 after placing the ice cream capsule 161 on the capsule support 172. Since the cups 151 are placed in the depression of the cup dispenser 150 in an inverted state, the robot arm 130 may stably grip the cups 151 one by one, and may invert the cup 151 again by rotating the gripper 132 and move the cup 151 after gripping the cup 151.

Figure 4D:
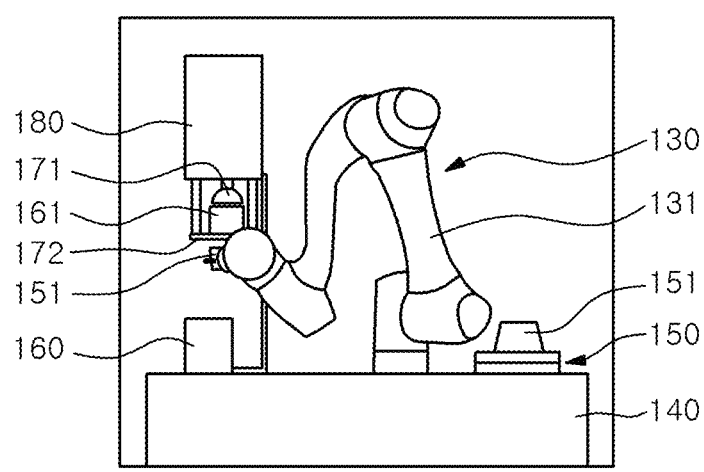

FIG. 4D shows the step of moving the cup 151 under the capsule support 172 while the gripper 132 is gripping the cup 151 and then filling the cup 151 with ice cream by discharging the ice cream into the cup 151 through the downward movement of the push bar 171.

Figure 4E:
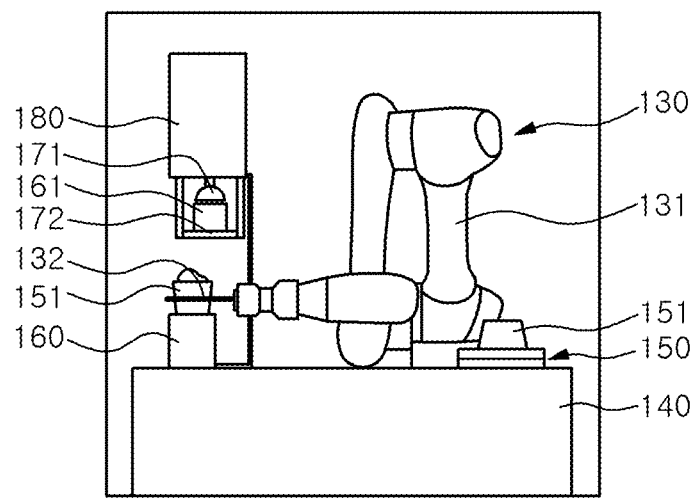

FIG. 4E shows the step of placing the cup 151 filled with ice cream at a predetermined location, e.g., the location of the capsule dispenser 160, after overall ice cream has been discharged into the cup 151 and then providing the cup 151 filled with ice cream to a user.

Figure 4F:
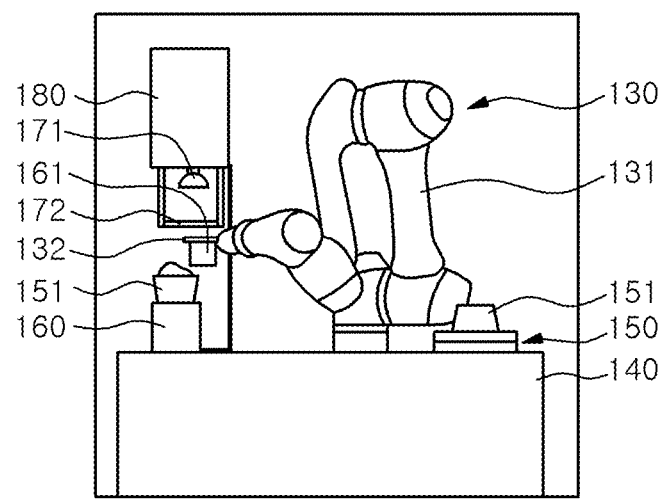

FIG. 4F shows the step of gripping a capsule container remaining on the capsule support 172 via the gripper 132 and then discharging the capsule container to a predetermined location, e.g., an outlet such as the discharge hole 141.

Figure 5:
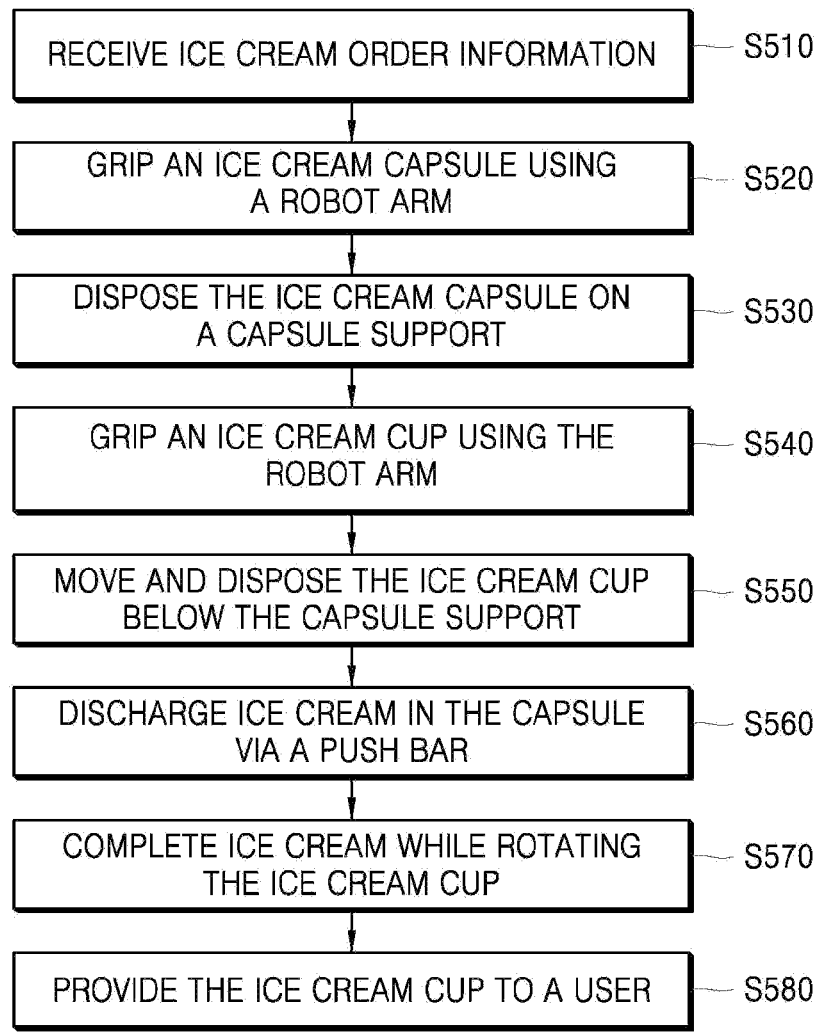
FIG. 5 is a flowchart illustrating the operation of controlling a robot arm system according to an embodiment of the present invention.

FIG. 5 is a flowchart illustrating the operation of controlling a robot arm system according to an embodiment of the present invention.

First, ice cream order information, including selection information such as the flavor, topping, and size of ice cream, may be received from a user at step S510. Order information may be received from a user terminal via the communication interface 110 of the robot arm system 100, or an order may be directly received via the display 180.

Next, after the order information has been received, the ice cream capsule 161 corresponding to a selected flavor may be gripped using the robot arm 130 at step S520. The ice cream capsules 161 corresponding to individual flavors may be disposed at predetermined locations for respective types, or the ice cream capsule 161 corresponding to the selected flavor may be automatically identified via an image sensor or RFID communication and then gripped.

Next, the robot arm 130 may place the ice cream capsule 161 at a designated location by moving and placing the ice cream capsule 161 onto the capsule support 172 after gripping the ice cream capsule 161 at step S530.

Next, the robot arm 130 may move to the location where the ice cream cup 151 is placed and grip the ice cream cup 151 at step S540.

Next, the robot arm 130 may move and place the ice cream cup 151 under the capsule support 172 while gripping the ice cream cup 151 at step S550.

Next, the ice cream in the capsule may be discharged downward by pressing the ice cream capsule 161 through the downward movement of the push bar 171 at step S560.

In this case, the robot arm 130 may complete whirlpool-shaped ice cream by stacking ice cream while rotating the ice cream cup 151 inclined at a predetermined angle at step S570.

Next, when the ice cream is completed, it may be provided to a user by placing the ice cream cup 151 at a predetermined location or a location close to the user at step S580.

The various embodiments described herein may be implemented by hardware, middleware, microcode, software, and/or combinations thereof. For example, the various embodiments may be implemented in one or more application specific semiconductors (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions presented herein, and/or one or more combinations thereof.

Furthermore, for example, the various embodiments may be stored or encoded in a computer-readable medium containing instructions. The instructions stored or encoded in a computer-readable medium may cause a programmable processor or another processor to perform a method, e.g., when the instructions are executed. The computer-readable medium includes both computer storage media and communication media including any media that facilitate the transfer of a computer program from one place to another. The storage medium may be any available medium that can be accessed by a computer. For example, the computer-readable medium may include random access memory (RAM), read-only memory (ROM), electrically erasable programmable read-only memory (EEPROM), compact disk read-only memory (CD-ROM), other optical disk storage media, magnetic disk storage media, other magnetic storage devices, and any other media that can be used to carry or store desired program code in the form of instructions or data structures accessible by a computer.

The hardware, the software, the firmware, etc. may be implemented in the same device or separate devices in order to support the various operations and functions described herein. Additionally, components, units, modules, components, etc. described as "units" herein may be implemented together, or may be implemented individually as interoperable logic devices. The depictions of the different features of modules, units, etc. are intended to highlight different functional embodiments, and do not necessarily imply that these must be embodied by separate hardware or software components. Rather, the functions associated with one or more modules or units may be performed by separate hardware or software components or may be integrated into the same hardware or software component.

Although operations are shown in a particular order in the drawings, it should be understood that the operations may be performed in the shown particular order or in another sequential order or all the shown operations may not be necessarily performed in order to achieve a desired result. In some circumstances, multitasking and parallel processing may be advantageous. Moreover, the division of various components in the above-described embodiments should not be construed as being required in all the embodiments. It should be understood that described components may be integrated into a single software product or may be packaged into multiple software products.

Although the present invention has been described with reference to the embodiment shown in the drawings, this is merely illustrative, and it will be understood by those of ordinary skill in the art that various modifications and equivalent embodiments may be possible therefrom. Therefore, the true technical protection range of the present invention should be determined based on the technical spirit of the appended claims.

What is claimed is:

1. A method of controlling a robot arm to make ice cream, the method comprising:
   receiving ice cream order information;
   gripping an ice cream capsule disposed on a table using a gripper of a robot arm;
   placing the ice cream capsule on a capsule support;
   gripping a cup configured to accommodate ice cream using the gripper of the robot arm;
   moving the cup under the capsule support while the gripper is gripping the cup; and
   discharging ice cream in the ice cream capsule to the cup,
   wherein discharging the ice cream comprises controlling the robot arm so that the cup is rotated while the ice cream is being discharged,
   wherein discharging the ice cream comprises:
   pressing the ice cream capsule disposed on the capsule support through movement of a push bar; and
   discharging the ice cream through a hole in a bottom surface of the ice cream capsule in response to a pressure applied by the push bar,
   wherein an image sensor configured to photograph a bottom surface of the ice cream capsule is disposed on a bottom surface of the capsule support, and
   wherein a time point at which the ice cream starts to be discharged is recognized via the image sensor, a time difference between the time point at which the ice cream starts to be discharged and a time point at which the push bar starts to operate is calculated, and the robot arm is controlled such that a rotation speed of the cup is changed based on the time difference.

2. The method of claim 1, further comprising:
   determining a hardness of the ice cream using a pressure sensor disposed on a bottom surface of the push bar; and
   controlling the robot arm so that a rotation speed of the cup is changed based on the hardness of the ice cream.

3. The method of claim 1, wherein the pressure applied by the push bar is changed based on a type of ice cream.

4. The method of claim 1, wherein the robot arm is controlled such that a rotation speed of the cup is changed based on a type of ice cream.

5. The method of claim 4, wherein the robot arm is controlled such that a rotation speed and rotation radius of the cup are changed based on a size of the cup.

6. The method of claim 1, wherein the image sensor is an infrared (IR) sensor, a time point at which the ice cream starts to be discharged and a time point at which the discharge of the ice cream ends are recognized via the image sensor, and the robot arm is controlled such that the cup is rotated in a state of being inclined at a predetermined angle while the ice cream is being discharged.

7. The method of claim 1, wherein a type of ice cream is recognized via the image sensor, and the robot arm is controlled such that a rotation speed of the cup is changed based on the type of ice cream.

8. The method of claim 1, further comprising, after discharging the ice cream:
placing the cup, in which the ice cream is accommodated, at a predetermined location; and
gripping the ice cream capsule placed on the capsule support, and discharging the ice cream capsule to a predetermined discharge hole.

9. A robot arm system for controlling a robot arm for making of ice cream, the robot arm system comprising:
a robot arm comprising a gripper and a plurality of arms;
a processor configured to receive and process ice cream order information;
a capsule support configured to support an ice cream capsule;
a push bar configured to press the ice cream capsule disposed on the capsule support; and
an image sensor configured to photograph a bottom surface of the ice cream capsule and to be disposed on a bottom surface of the capsule support,
wherein the processor is further configured to:
grip the ice cream capsule disposed on a table using the gripper of the robot arm;
place the ice cream capsule on the capsule support;
grip a cup configured to accommodate ice cream using the gripper of the robot arm;
move the cup under the capsule support while the gripper is gripping the cup; and
discharge ice cream in the ice cream capsule to the cup; and
wherein the processor is further configured to control the robot arm so that the cup is rotated while the ice cream is being discharged,
wherein the ice cream is discharged through a hole in a bottom surface of the ice cream capsule in response to a pressure applied by the push bar, and
wherein the processor is further configured to recognize a time point at which the ice cream starts to be discharged via the image sensor, to calculate a time difference between the time point at which the ice cream starts to be discharged and a time point at which the push bar starts to operate, and to control the robot arm so that a rotation speed of the cup is changed based on the time difference.

10. The robot arm system of claim 9, further comprising a pressure sensor disposed on a bottom surface of the push bar,
wherein the processor is further configured to control the robot arm so that a rotation speed of the cup is changed based on a hardness of the ice cream determined using the pressure sensor.

11. The robot arm system of claim 9, wherein the processor is further configured to change the pressure applied by the push bar based on a type of ice cream.

12. The robot arm system of claim 9, wherein the processor is further configured to control the robot arm so that a rotation speed of the cup is changed based on a type of ice cream.

13. The robot arm system of claim 12, wherein the processor is further configured to control the robot arm so that a rotation speed and rotation radius of the cup are changed based on a size of the cup.

14. The robot arm system of claim 9, wherein the processor is further configured to recognize a type of ice cream via the image sensor and to control the robot arm so that a rotation speed of the cup is changed based on the type of ice cream.

* * * * *